United States Patent
Thiagarajan (10) Patent No.: US 8,208,740 B2
(45) Date of Patent: Jun. 26, 2012

(54) STREAMING REPETITION CODED COMPRESSION

(75) Inventor: Arvind Thiagarajan, Tamil Nadu (IN)

(73) Assignee: MatrixView Limited, Singapore (SG)

( * ) Notice: Subject to any disclaimer, the term of this patent is extended or adjusted under 35 U.S.C. 154(b) by 761 days.

(21) Appl. No.: 12/087,013

(22) PCT Filed: Mar. 3, 2007

(86) PCT No.: PCT/SG2007/000063
§ 371 (c)(1),
(2), (4) Date: Mar. 27, 2009

(87) PCT Pub. No.: WO2007/100307
PCT Pub. Date: Sep. 7, 2007

(65) Prior Publication Data
US 2009/0262991 A1    Oct. 22, 2009

(30) Foreign Application Priority Data
Mar. 3, 2006 (SG) .............................. 200601418-7

(51) Int. Cl.
*G06K 9/00* (2006.01)
(52) U.S. Cl. ........................................... 382/232
(58) Field of Classification Search .......... 382/232–253, 382/299–298; 375/240.01–240.29; 358/426.1–426.16; 709/247
See application file for complete search history.

(56) References Cited

U.S. PATENT DOCUMENTS

| | | | | |
|---|---|---|---|---|
| 5,402,248 A * | 3/1995 | Sato et al. | | 382/234 |
| 5,751,860 A * | 5/1998 | Su et al. | | 382/244 |
| 5,880,856 A * | 3/1999 | Ferriere | | 358/426.11 |
| 6,263,109 B1 * | 7/2001 | Ordentlich et al. | | 382/232 |
| 6,310,978 B1 * | 10/2001 | Persiantsev | | 382/236 |
| 6,909,811 B1 * | 6/2005 | Kajiwara et al. | | 382/246 |
| 7,224,839 B2 * | 5/2007 | Zeineh | | 382/232 |
| 7,930,434 B2 * | 4/2011 | Aguera y Arcas et al. | | 709/247 |

FOREIGN PATENT DOCUMENTS

| | | |
|---|---|---|
| EP | 1379090 A2 | 1/2004 |
| EP | 1548988 A1 | 6/2005 |
| WO | WO-2005/057937 A1 | 6/2005 |

* cited by examiner

*Primary Examiner* — Ishrat I Sherali
(74) *Attorney, Agent, or Firm* — Birch, Stewart, Kolasch & Birch, LLP (57) ABSTRACT

A method for transmitting a compressed image via a network, the method comprising: converting (11) the compressed image into a plurality of images, each of the plurality of images having a predetermined resolution level which is less than the original resolution of the image; transforming (12) each of the plurality of images into a data stream; and transmitting (13) each data stream in order according to resolution level, from the lowest resolution level to the original resolution of the image; wherein the compressed image is an image compressed (10) by comparing each image element with a previous image element and; if they are both equal, a first value is recorded; and if they are not both equal, a second value is recorded.

34 Claims, 14 Drawing Sheets

STREAMING REPETITION CODED COMPRESSION

CROSS-REFERENCE TO RELATED APPLICATIONS

Title: REPETITION CODED COMPRESSION FOR HIGHLY CORRELATED IMAGE DATA
Application No.: PCT/IN03/00049 Filed: 7 Mar. 2003
Inventor: Arvind Thiagarajan
Title: COMPRESSING IMAGE DATA
Application No.: PCT/SG2004/000411 Filed: 15 Dec. 2004
Inventor: Arvind Thiagarajan

TECHNICAL FIELD

The invention concerns a method for transmitting a compressed image via a network.

BACKGROUND OF THE INVENTION

Repetition Coded Compression (RCC) is a technology invented by the present inventor to increase compressibility of data. RCC is disclosed in the two previously filed cross-related applications, the contents of which are herein incorporated by reference.

RCC achieves a very impressive level of compression based on coding repetitions. For example, consider this data sequence of pixel values, where each pixel is represented by 8 bits:

| Data Sequence: | 10 | 10 | 10 | 9 | 8 | 8 | 9 | 10 | 10 |
|---|---|---|---|---|---|---|---|---|---|
| Bit Plane: | 0 | 1 | 1 | 0 | 0 | 1 | 0 | 0 | 1 |
| Value Stored: | 10 | | | 9 | 8 | | 9 | 10 | |

Using RCC, the data sequence is able to be compressed by 32% in this example.

RCC is a visually lossless compression technique and is also pixel-to pixel lossless with zero means square error (MSE). Unlike other compression algorithms, RCC does not require floating point conversions or quantization which eliminates truncation, approximation and quantization errors.

However, there is a need to extend and enhance RCC for use in certain computing environments and applications.

SUMMARY OF THE INVENTION

In a first preferred aspect, there is provided a method for transmitting a compressed image via a network, the method comprising:
converting the compressed image into a plurality of images, each of the plurality of images having a predetermined resolution level which is less than the original resolution of the image;
transforming each of the plurality of images into a data stream; and
transmitting each data stream in order according to resolution level, from the lowest resolution level to the original resolution of the image;
wherein the compressed image is an image compressed by comparing each image element with a previous image element and: if they are both equal, a first value is recorded; and if they are not both equal, a second value is recorded.

The method may further comprise decompressing the compressed image, the decompressing comprising:
run-length decoding the compressed data;
arithmetically decoding the compressed data;
reverse transforming the decoded data; and
rearranging the transformed decoded data into a lossless decompressed form.

The method may further comprise progressively displaying the image as each data stream is received and decompressed.

The method may further comprise displaying the image after all data streams are received and decompressed.

The transmission of data streams may be interruptible before the transmission of the data stream having the original resolution of the image.

The compressed image may be transformed into each resolution level by dividing the original resolution by a predetermined integer.

All images may have the same bit depth.

The method may further comprise the initial step of:
comparing each image element with a previous image element and if they are within a predetermined range of each other, modifying the Image element to be equal to the previous image element;
where repetition is increased to enable lossy compression of the image.

The first and second values may be recorded in a bit plane.

The method may further comprise encoding repeating first and second values in the bit plane into a bit plane index.

The images may be archived Images In a Picture Archiving and Communication System (PACS), and the data streams are transmitted from a distributed storage server.

In a second aspect, there is provided a Picture Archiving and Communication System comprising:
at least one modality to collect images;
a gateway to receive the collected images and compress the images, the gateway compressing each image by comparing each image element with a previous image element and: if they are both equal, a first value is recorded; and if they are not both equal, a second value is recorded;
a storage device to store the compressed images;
at least one workstation to retrieve and display images;
wherein each compressed image is transmitted to the at least one workstation by converting the compressed image into a plurality of images, each of the plurality of images having a predetermined resolution level which is less than the original resolution of the image;
transforming each of the plurality of images into a data stream; and
transmitting each data stream in order according to resolution level, from the lowest resolution level to the original resolution of the image.

The system may further comprise a streaming sever to provide additional load balancing within the system.

The storage device may comprise an online storage portion to store the data streams and an offline storage portion to store compressed images.

The system may further comprise a database server to manage the workflow within the system.

The at least one modality may be any one consisting of the group: X-RAY, CT, MRI, and US.

The gateway may be a DICOM gateway.

In a third aspect, there is provided a method for transmitting a compressed Image to a user, the method comprising:
converting the compressed image into a data stream; and
transmitting the data stream to the user;

wherein the compressed image is an image compressed by comparing each image element with a previous image element and: if they are both equal, a first value is recorded; and if they are not both equal, a second value is recorded.

The compressed image may be stored in a static form in an image repository.

The data stream may be a dynamic form of the compressed image.

The method may further comprise decompressing the data stream as each portion of the data stream is received by the user, the decompressing comprising:

run-length decoding the compressed data;
arithmetically decoding the compressed data;
reverse transforming the decoded data; and
rearranging the transformed decoded data into a lossless decompressed form.

The method may further comprise progressively displaying the image to the user as each portion of the data stream is received and decompressed.

BRIEF DESCRIPTION OF THE DRAWINGS

An example of the invention will now be described with reference to the accompanying drawings, in which.

DETAILED DESCRIPTION OF THE DRAWINGS

The drawings and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
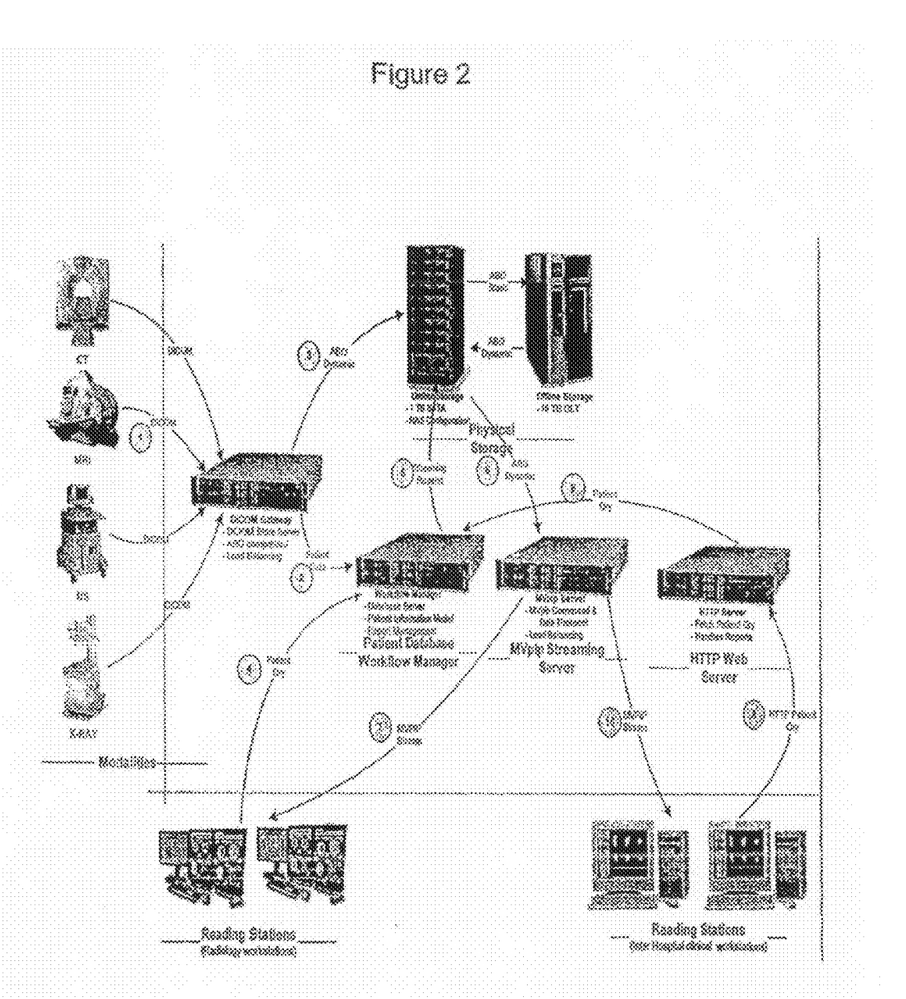
FIG. 2 is a block diagram of a Picture Archiving and Communication System (PACS) in accordance with a preferred embodiment of the present invention.
Figure 13:
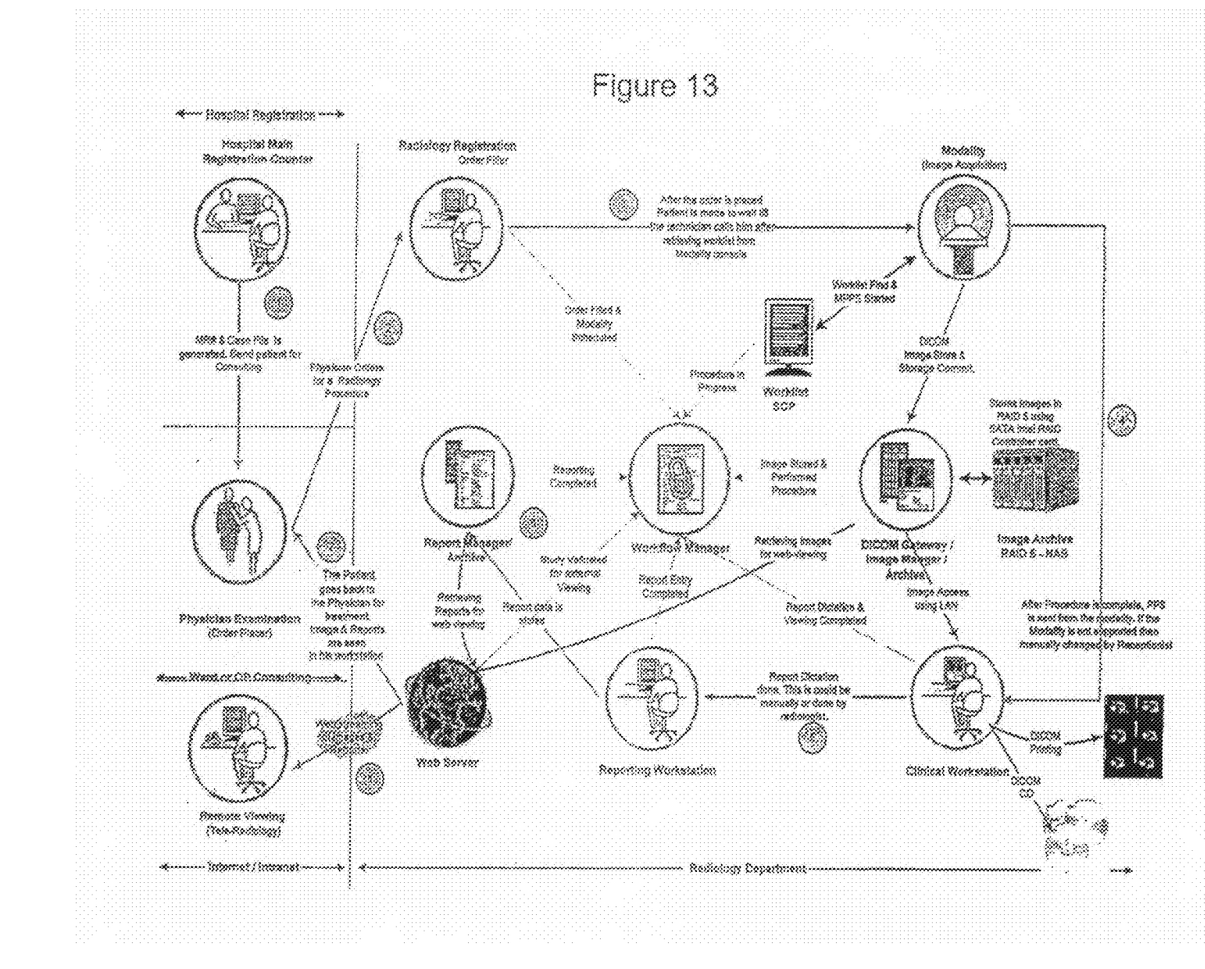
FIG. 13 is entity relationship diagram illustrating the interaction and data flow between entities within the system.

Referring to FIGS. 2 and 13, a Picture Archiving and Communication System 50 is provided to store and retrieve images within a hospital network environment. The system comprises: modalities 51, a gateway 52, a storage device 53 and workstations 54.

The modalities 51 capture and collect high-resolution medical images. Modalities 51 typically include: MRI, CT, US, or X-RAY machines.

The gateway 52 is a Digital Imaging and Communications in Medicine (DICOM) gateway 52 for receiving the collected images from the modalities and compressing the images. DICOM is an industry standard which enables digital communication between diagnostic and therapeutic equipment and systems from various manufacturers. An RCC compressor software module (for example, a CODEC) is executed in the DICOM gateway 52 to carry out Repetition Coded Compression (RCC) compression. The RCC compression causes each image to be compressed by comparing each image element with a previous image element and: if they are both equal, a first value is recorded; and if they are not both equal, a second value is recorded. The first and second values are recorded in a bit plane. Repeating first and second values in the bit plane are encoded into a bit plane index to further enhance compression.

The storage device 53 stores the compressed images in an archived form. The storage device 53 comprises an online storage portion 53A to store the data streams and an offline storage portion 53B to store compressed images. The online storage portion 53A is an SATA device whereas the offline storage portion 53B is a DLT device. Typically, the DLT device 53B has a much higher storage capacity the online storage portion 53A but does not have fast seek/access times as the SATA device 53A. To further enhance response times, the SATA device 53A may be configured in a RAID array. Alternatively, rather than SATA, a SCSI device 53A may be used.

The workstations 54 are dispersed throughout the hospital and are used for retrieving and displaying the archived images to users. Typically, the workstations 54 are terminals provide with a display device such as an LCD monitor. The workstations 54 may be touchscreen operated or are desktop computers with keyboards and mice. The workstations 54 also have the RCC codes software installed in order to decompress incoming images.

Figure 4:
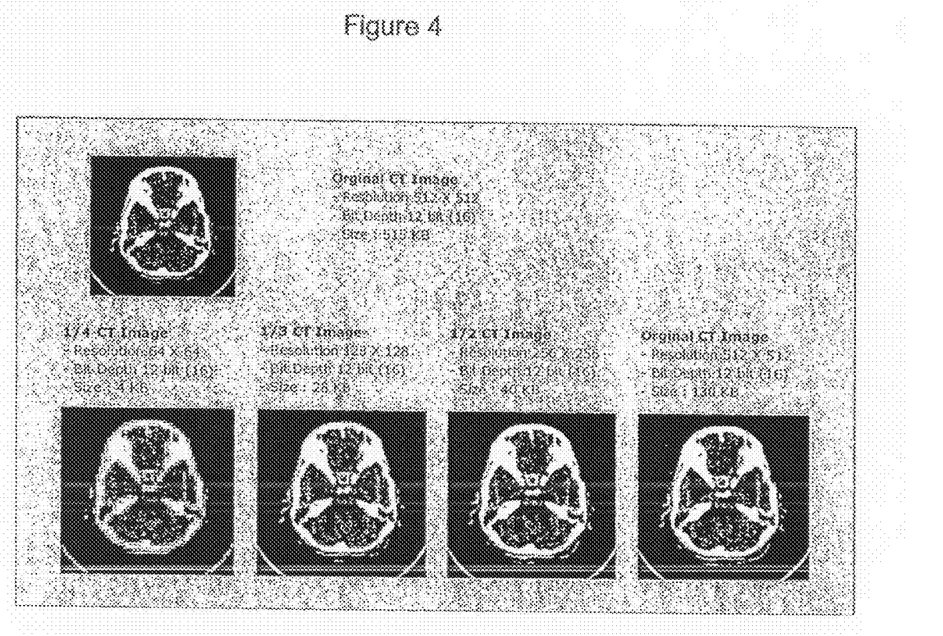
FIG. 4 is a series of screenshots of streaming patterns for data streams of a compressed image.

Each requested compressed image is transmitted to a workstation 54 by converting the compressed image into a plurality of images. Each image has a predetermined resolution level which is less than the original resolution of the image. The compressed image is transformed Into each resolution level by dividing the original resolution by a predetermined integer. Turning to FIG. 4, for example, a CT image has a resolution of 512×512 pixels with a bit depth of 12 bit (16), the size is 515 KB. After RCC compression, the CT image is only 130 KB. The original resolution of the CT image is reduced by 50% (dividing the resolution by 2), so that it is now 256×256 pixels with the same bit depth, and now the size is 40 KB. If the original resolution is divided by 3, the resolution is 128×128 pixels and the size is 28 KB. If the original resolution is divided by 4, the resolution is 64×64 pixels and the size is 4 KB.

Each of these smaller images is transformed into a data stream. The data streams are transmitted in order according to resolution level, from the lowest resolution level to the original resolution of the image to the workstation 54. For example, the 4 KB stream is transmitted first, then the 28 KB stream, then the 40 KB stream and lastly the 130 KB stream. All images have the same bit depth. However, it is possible in alternative embodiments to reduce the bit depth.

In a typical scenario, if ten people request the same CT image, there is only a 4 KB×10=40 KB, initial load on the network. This is in contrast to 515 KB×10=5150 KB load where no RCC compression and streaming are used.

As each data stream is received by the workstation 54, the RCC codec performs RCC decompression. Decompression involves: run-length decoding the compressed data; arithmetically decoding the compressed data; reverse transforming the decoded data; and rearranging the transformed decoded data into a lossless decompressed form.

After the data stream is decompressed, the image of the data stream is progressively displayed. The transmission of data streams is interruptible before the transmission of the data stream having the original resolution of the image. Alternatively, the image is only displayed after all data streams are received and decompressed.

To improve traffic flow within the network, additional server's are deployed within the network. These additional server's include a workflow manager such as a database server 55, a streaming server 56 to provide load balancing, and a HTTP server 57 to handle search queries and report generation.

For lossy implementations, the collected image is compressed by comparing each image element with a previous image element and if they are within a predetermined range of each other, modifying the image element to be equal to the previous image element. Repetition is increased to enable lossy compression of the image. Next, RCC compression is performed.

Figure 1:
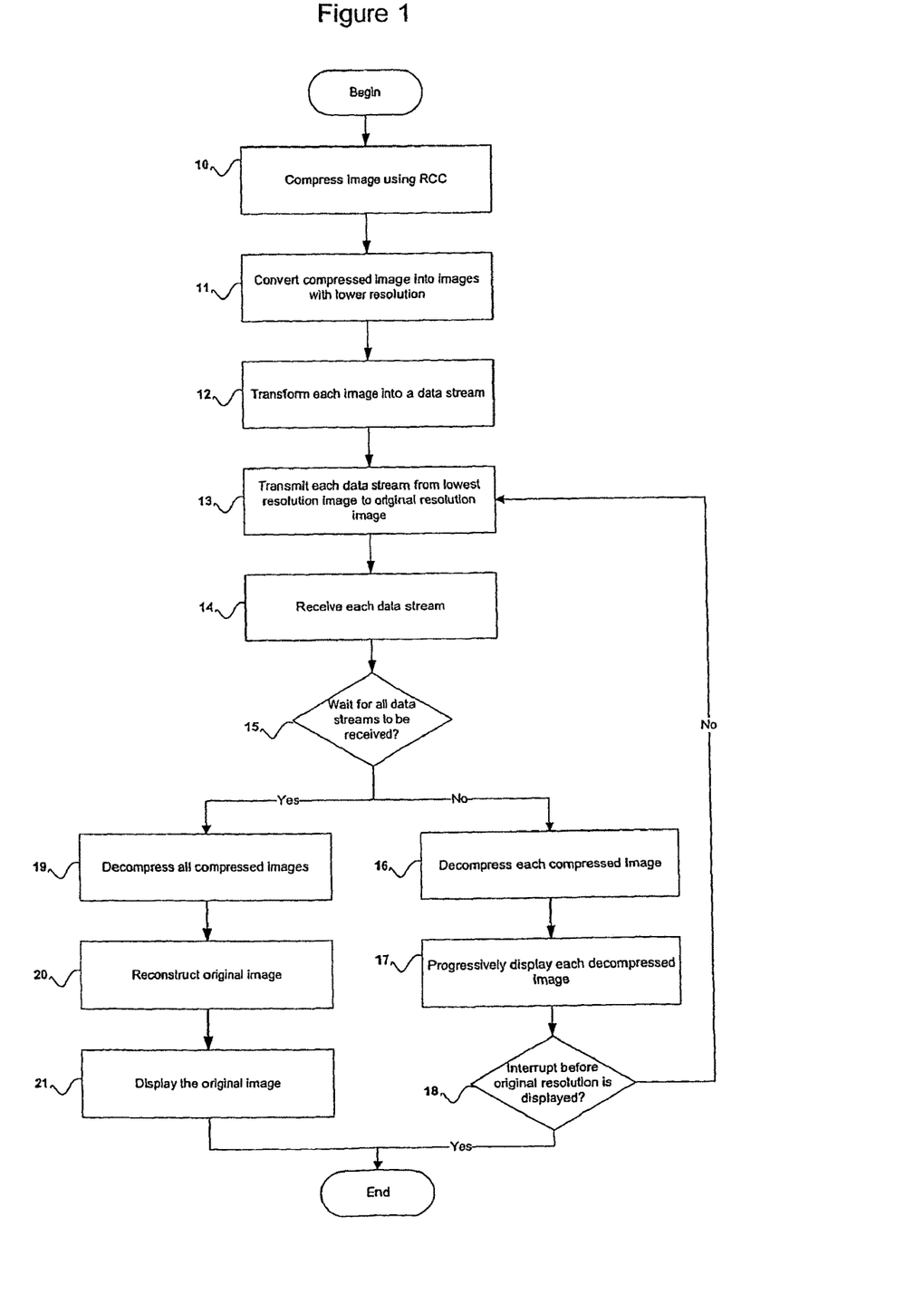
FIG. 1 is a process flow diagram of Streaming Repetition Coded Compression in accordance with a preferred embodiment of the present invention.

Turning to FIG. 1, in a typical scenario, an image is compressed, archived, distributed and displayed in the system as follows: the image is compressed 10 using RCC. The compressed image converted 11 into images with a lower resolution than the original resolution. This is turn reduces the overall size of these converted images. Each image is transformed 12 into a data stream for transmission. Each data stream is transmitted 13 starting from the lowest resolution image to the image with the original resolution. Each data stream 14 is received by the workstation. If progressive display is desired, then each compressed image is decompressed 16. The decompressed image is progressively displayed 17. If the user interrupts 18 the transmission, the streaming is stopped. If there is no interruption, the next data stream with a higher resolution is transmitted automatically. If progressive display is not desired, the user must wait 15 until all data streams have been transmitted. All the compressed images are decompressed 19, and the original image is reconstructed 20. The original image is then displayed 21 on the workstation.

Figure 3:
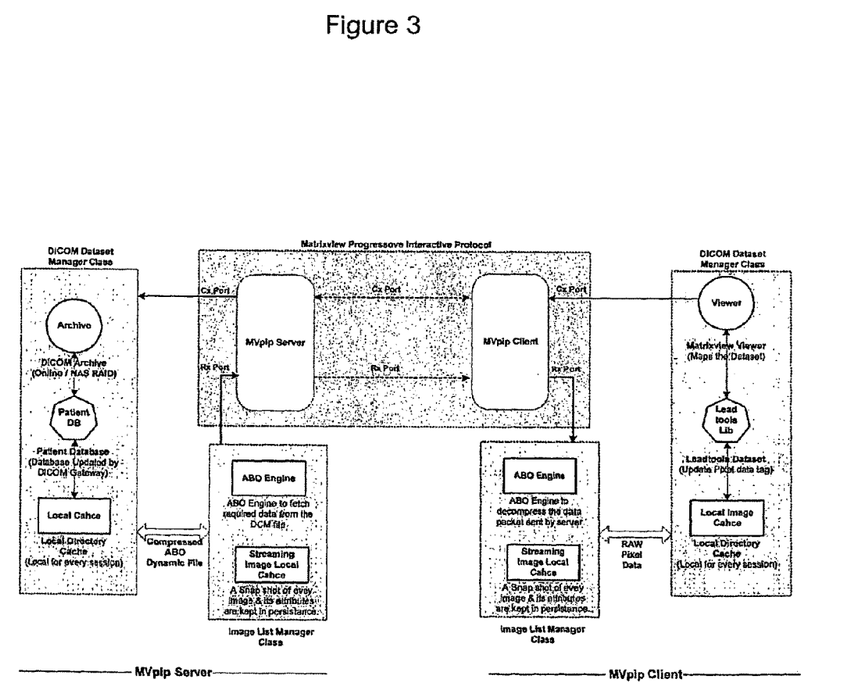
FIG. 3 is a high level design diagram of a streaming architecture in accordance with a preferred embodiment of the present invention.

Referring to FIG. 3, the streaming architecture 60 generally comprises three modules: DICOM dataset manager 61, image list manager 62 and the progressive interactive protocol 63. The DICOM dataset manager 61 consists of a DICOM archive 63, patient database 64 and a local directory 65. The archive 63 hosts the compressed images. The local directory 65 is used by the streaming engine 67 to store the request for compressed images. The image list manager 62 consists of a local cache 66 and the streaming engine 67. The local cache 66 stores the compressed images which have been requested without any header information. The streaming engine 67 provides streaming of the compressed data for different levels of image resolution based on the request. The progressive interactive protocol 63 provides the framework for the command/data transactions between the server and client (or peer to peer) to enable the compressed data to be progressively transmitted to the end user.

Referring to FIGS. 5 to 9, several modules in the streaming architecture 60 form the streaming engine 67, server and client. The modules include: the progressive interactive protocol 63, DICOM dataset manager 61, the DICOM archive 63, the local directory 65, the image list manager 62, RCC compression codec 67, image persistence 68 and memory management 69.

Figure 8:
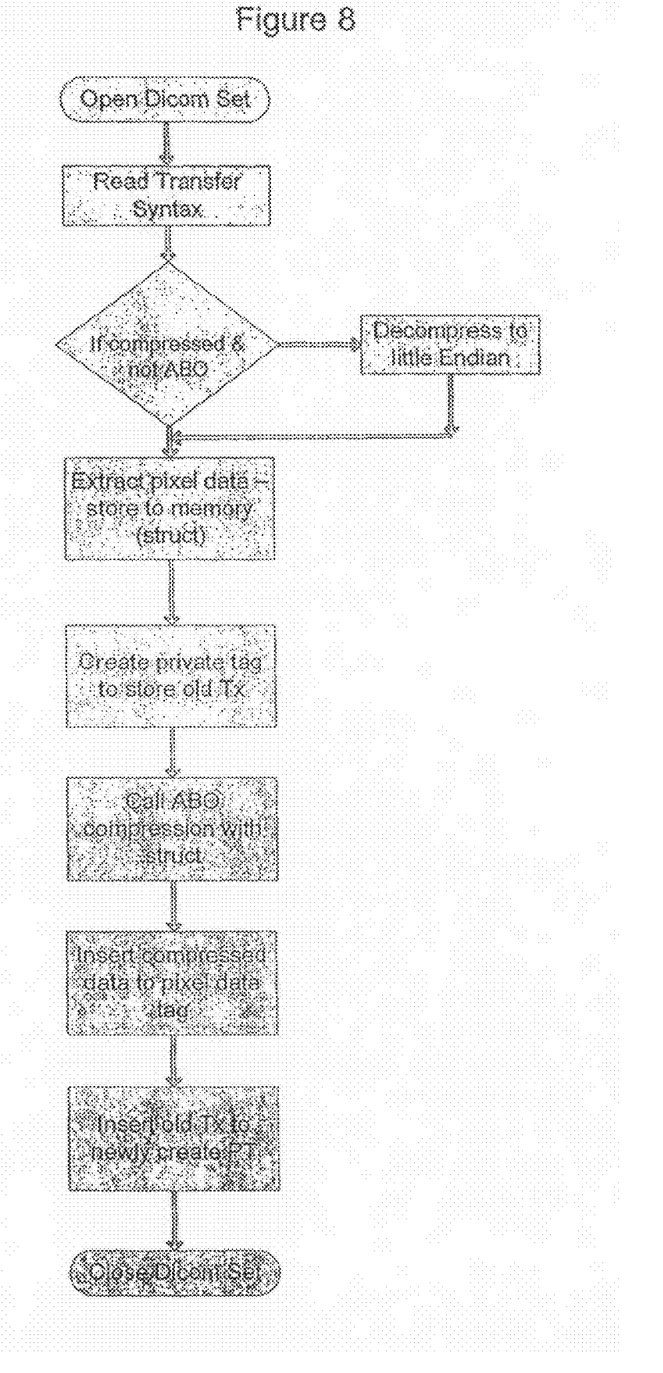
FIG. 8 is a process flow diagram of performing compression in the streaming architecture.
Figure 9:
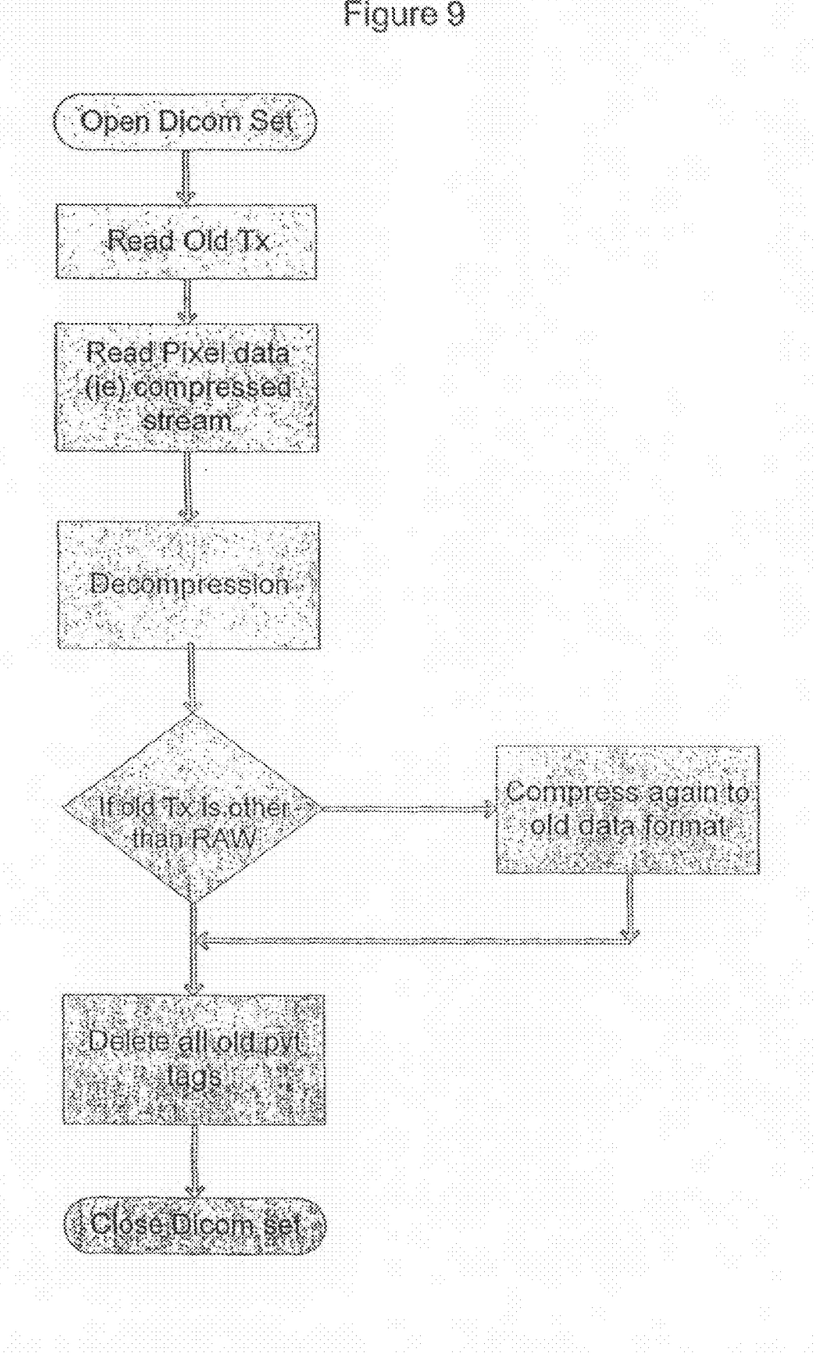
FIG. 9 is a process flow diagram of performing decompression in the streaming architecture.

FIGS. 8 and 9 illustrate ensuring a compressed bitstream is DICOM compatible. This is made possible by the availability of Private Tags in the DICOM standard. Using the private tags, any proprietary bitstream may be used and made DICOM compatible.

FIG. 8 illustrates a DICOM image being analyzed to determine whether it is compressed using the Transfer Syntax and Private Tags in DICOM Header information. If it is not compressed, RCC compression is applied to the DICOM image. If the DICOM image is already compressed, then the DICOM image is decompressed and then compressed again using RCC compression. The previous transfer syntax which forms a part of the DICOM header information is retained and while saving the RCC compressed image, appropriate private tags are added to denote that it is compressed by the RCC algorithm.

FIG. 9 illustrates a RCC compressed DICOM image being decompressed back to its original transfer syntax. The compressed file is analyzed and if it is an RCC compressed file, then RCC decompression is applied. Next, the decompressed image data is converted to the original transfer syntax. After this process is completed, all the Private Tags are deleted, so that the integrity of the DICOM Data Set is preserved.

The DICOM archive module 63 stores the compressed Image collected from the modalities via the DICOM gateway 52. When a request is made, the requested Image is copied to the local directory 65. This avoids direct access of the DICOM archive 63. A request typically includes the patient ID and an image ID.

Figure 5:
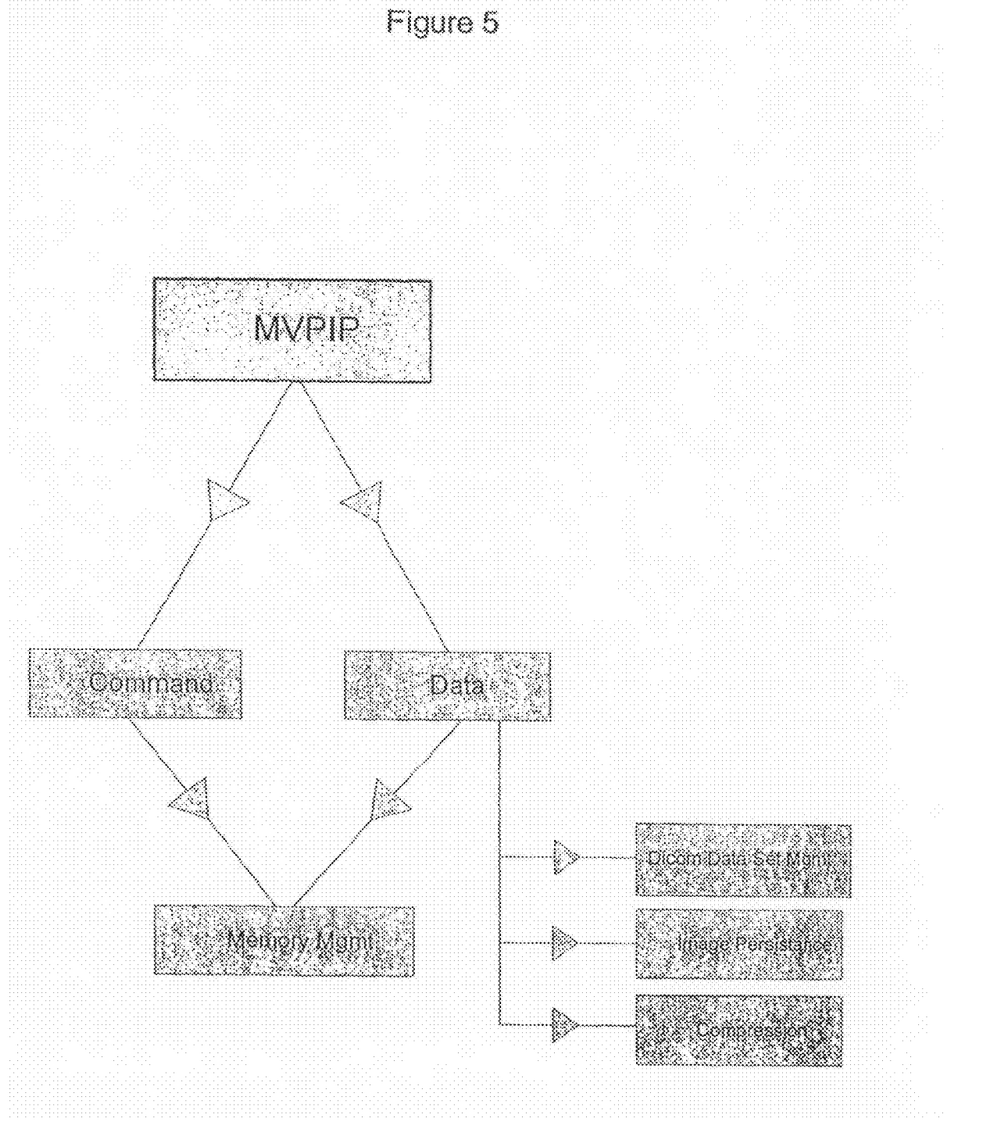
FIG. 5 is a medium level design diagram of the modules in the streaming architecture.
Figure 6:
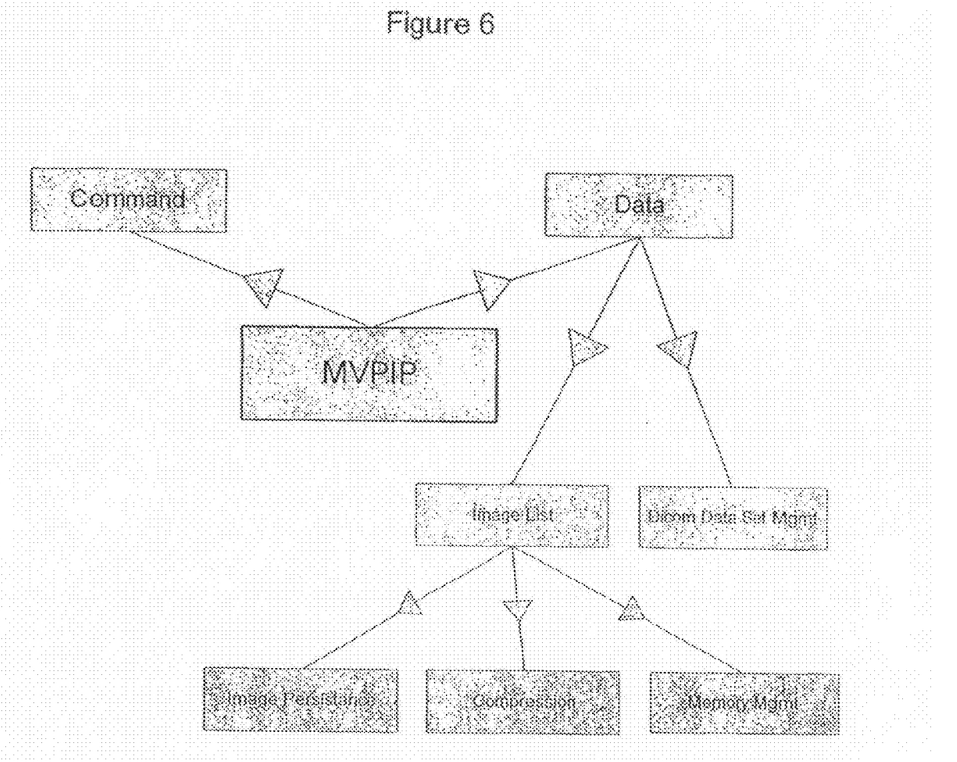
FIG. 6 is a class diagram illustrating the interaction of the modules in the streaming architecture.

The RCC compression codec module 67 delivers the compressed image, level-wise, based on a request. Data for different layers of granularity/resolution are stored in a pyramidal structure. The codec module 67 provides intelligent transmission/rendering of the image data. The codec module 67 is executed on both the server and client sides. The server side module transmits the compressed data progressively whereas the client side module provides progressive rendering of the various resolution levels of the image data into RAW format.

The image persistence module 68 retains the transmitted level and image data details or discards them if the transmission is interrupted and stopped. This module 68 also keeps the server and client synchronized.

The memory management module 69 performs all memory management for the images. Functions performed include memory allocation, deallocation, reallocation based on the image persistence state.

The sequence diagram (command and response) of the progressive interactive protocol 63 is as follows:

| Server | Client |
|---|---|
| 1. Session Acknowledge | 1. Session side |
| 2. Send image list | 2. Send Patient ID, Image ID |
| 3. Send compressed date (asynchronous) | 3. Images of interest (start, pause, stop) |
| 4. Send next level of resolution | 4. Acknowledge receipt |

The command diagram (from client to server), includes the following commands:

```
Get <image list>
Pause <image list>
Resume <image list>
Close session
Clear <image1, list1, ...>
```

The Get <image list> command is the first command issued after opening a session. The purpose of this command is to fetch images indicated in an image list from the DICOM archive 63 at the server side. The images are fetched to the viewer at the client side.

All the commands may be used in various combinations in order to enable implementation of complex instructions and macro-like functionality. For example, if a user is to restart a set of images at a later time, then the following commands are passed in sequence: Pause <image list>, Resume <image list>.

Figure 7:
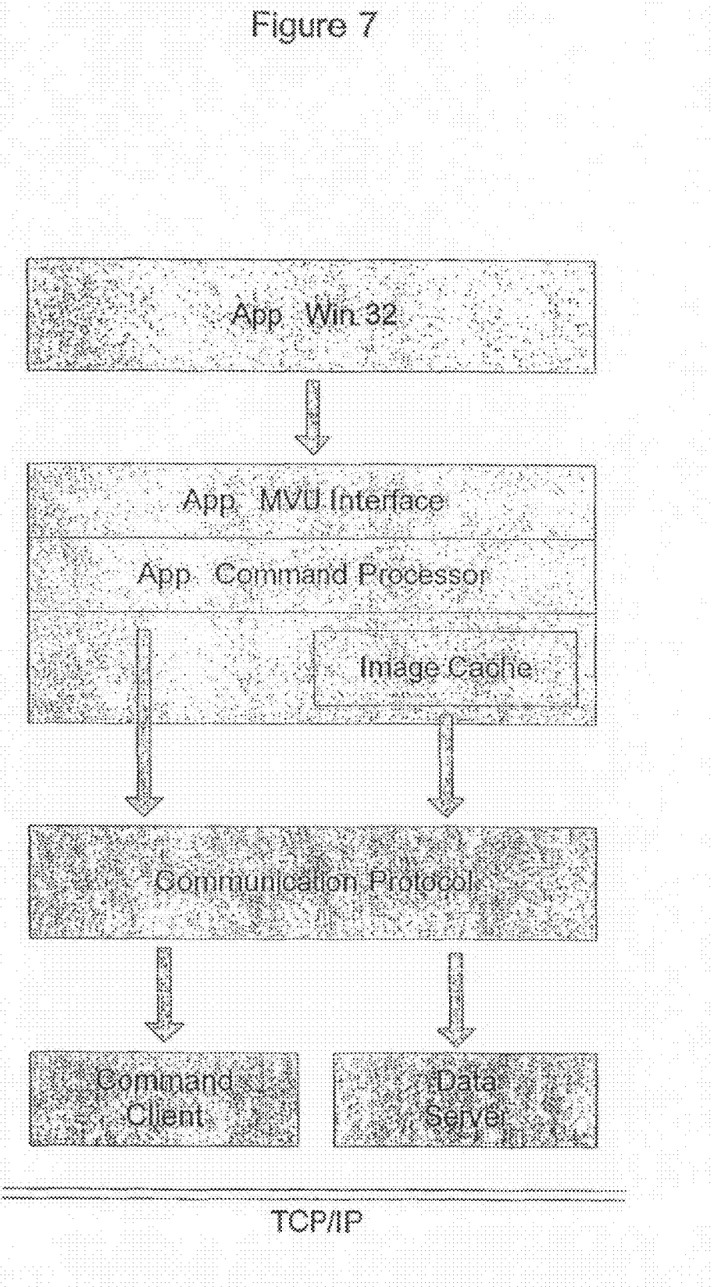
FIG. 7 is a client interface diagram of the streaming architecture.
Figure 14:
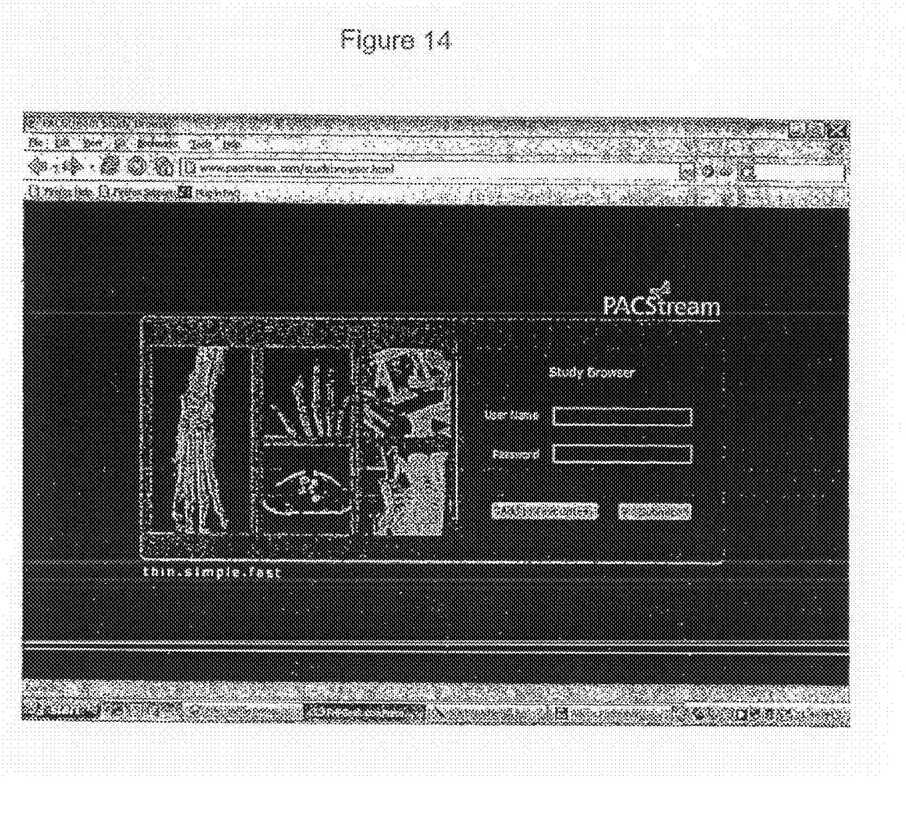
FIG. 14 is a screenshot of a login screen of the user interface of the system.
Figure 15:
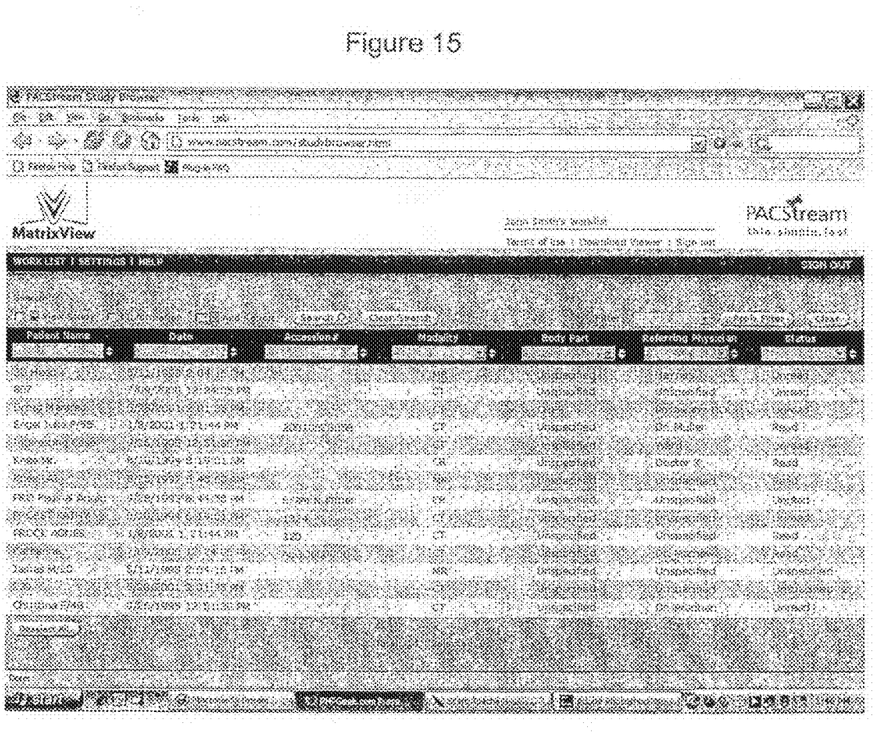
FIG. 15 is a screenshot of the image list manager.
Figure 16:
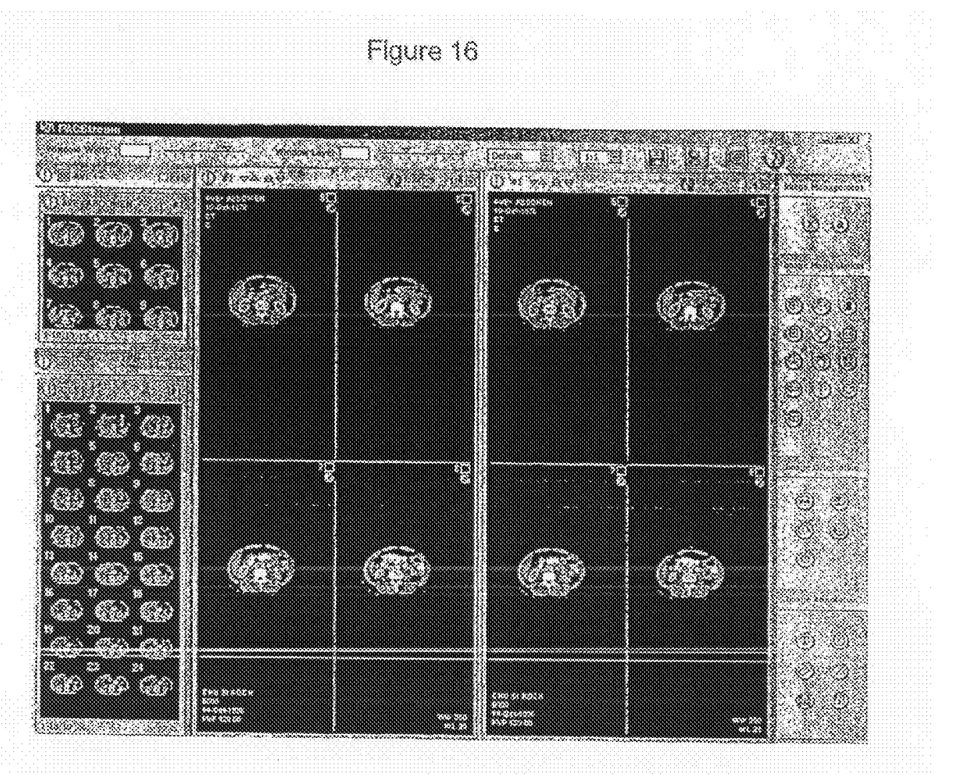
FIG. 16 is a screenshot of a set of images requested from the image list manager.

Referring to FIGS. 7 and 14 to 16, the client interface enables the client 700 to interact with the viewer 750 to receive and render the images onto the viewer 750. FIG. 7 illustrates a viewer compiled for the Microsoft Windows operating system. The application interface 702 of the viewer sits on top of the operating system 701. The viewer 750 also has a command processor 703 to process user commands and a local image cache 704 to store received image files. To communicate with the command client 707 and data server 708 at the server side, the viewer 750 communicates via the progressive interactive protocol 706. The interface 702 may be presented in a web browser as illustrated. FIG. 14 depicts a login screen, to authenticate the user before access to the system is allowed. FIG. 15 is a screenshot of the image list manager. The columns of the screen indicates the modality source, date of the image, the patient's name etc. FIG. 16 is a screenshot of an image selected from the image list manager.

Figure 10:
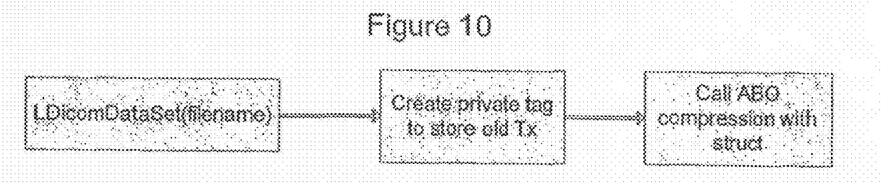
FIG. 10 is a process flow diagram for an alternative method to perform compression in the streaming architecture.
Figure 11:
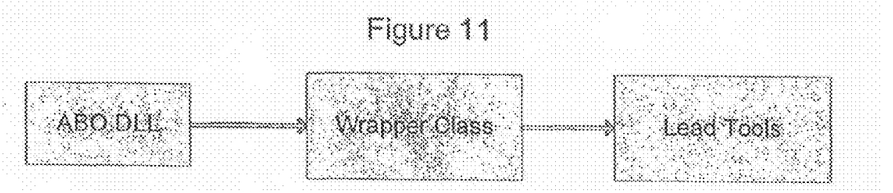
FIGS. 11 and 12 are interaction diagrams between modules used in the alternative method.
Figure 12:
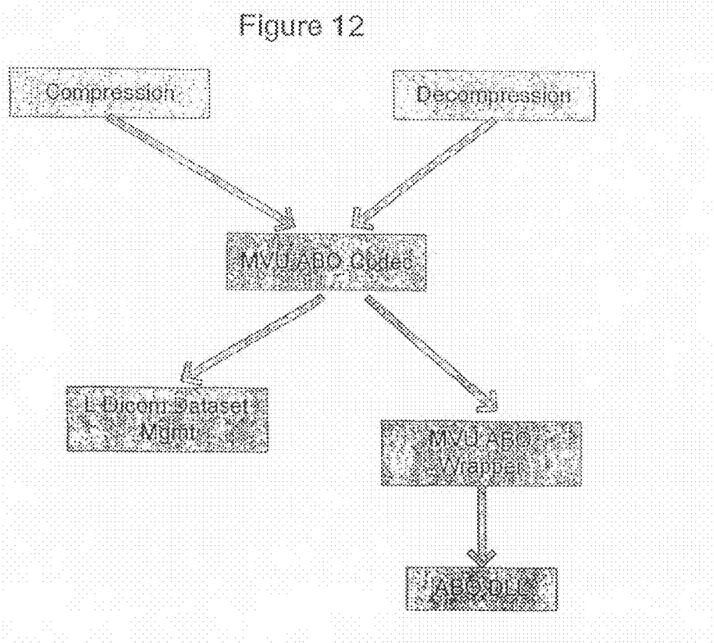

Referring to FIGS. 10 to 12, an alternative method to perform compression in the streaming architecture 60 is illustrated. A third party product such as Lead Tools 71 is used to interface the RCC codec 67 with the DICOM dataset manager 61 and other modules. A wrapper class 70 is provided to enable functions of the RCC codec 67 to be called by Lead Tools 71. In this example, the RCC codec 67 is embodied in a Windows library file, named "ABO.DLL".

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

I claim:

1. A method for transmitting a compressed image via a network, the method comprising:
   converting the compressed image into a plurality of images, each of the plurality of images having a predetermined resolution level which is less than the original resolution of the compressed image;
   transforming each of the plurality of images into a data stream; and
   transmitting each data stream in order according to resolution level, from the lowest resolution level to the original resolution of the compressed image;
   wherein the compressed image is an image compressed by comparing each image element with a previous image element and: if they are both equal, a first value is recorded; and if they are not both equal, a second value is recorded.

2. The method according to claim 1, further comprising decompressing the compressed image, the decompressing comprising:
   run-length decoding the compressed data;
   arithmetically decoding the compressed data;
   reverse transforming the decoded data; and
   rearranging the transformed decoded data into a lossless decompressed form.

3. The method according to claim 2, further comprising progressively displaying the image as each data stream is received and decompressed.

4. The method according to claim 2, further comprising displaying the image after all data streams are received and decompressed.

5. The method according to claim 1, wherein the transmission of the data streams is interruptible before the transmission of the data stream having the original resolution of the compressed image.

6. The method according to claim 1, wherein the compressed image is transformed into each resolution level by dividing the original resolution by a predetermined integer.

7. The method according to claim 1, wherein all images have the same bit depth.

8. The method according to claim 1, further comprising the initial step of:
   comparing each image element with a previous image element and if they are within a predetermined range of each other, modifying the image element to be equal to the previous image element;
   where repetition is increased to enable lossy compression of the image.

9. The method according to claim 1, wherein the first and second values are recorded in a bit plane.

10. The method according to claim 9, further comprising encoding repeating first and second values in the bit plane into a bit plane index.

11. The method according to claim 1, wherein the images are archived images in a Picture Archiving and Communication System (PACS), and the data streams are transmitted from a distributed storage server.

12. A Picture Archiving and Communication System (PACS) comprising:
   at least one modality to collect images;
   a gateway to receive the collected images and compress the collected images, the gateway compressing each collected image by comparing each image element with a previous image element and: if they are both equal, a first value is recorded; and if they are not both equal, a second value is recorded;
   a storage device to store the compressed images;
   at least one workstation to retrieve and display images;
   wherein each compressed image is transmitted to the at least one workstation by converting the compressed image into a plurality of images, each of the plurality of images having a predetermined resolution level which is less than the original resolution of the compressed image;

transforming each of the plurality of images into a data stream; and transmitting each data stream in order according to resolution level, from the lowest resolution level to the original resolution of the compressed image.

13. The system according to claim 12, further comprising a streaming sever to provide additional load balancing within the system.

14. The system according to claim 12, wherein the storage device comprises an online storage portion to store the data streams and an offline storage portion to store compressed images.

15. The system according to claim 12, further comprising a database server to manage the workflow within the system.

16. The system according to claim 12, wherein the at least one modality is any one of: X-RAY, CT, MRI, and US.

17. The system according to claim 12, wherein the gateway is a DICOM gateway.

18. The system according to claim 12, wherein the compressed image is transformed into each resolution level by dividing the original resolution by a different predetermined value.

19. The system according to claim 12, wherein the plurality of images each represent the compressed image.

20. The system according to claim 12, wherein the predetermined resolution level is independent of the compressed image.

21. The system according to claim 12, wherein the predetermined resolution level is independent of the transmission.

22. A method for transmitting a compressed image via a network, the method comprising:

providing an image that includes image elements;

compressing the image into a first image by comparing each image element with a previous image element and if they are both equal, a first value is recorded, and if they are not both equal, a second value is recorded, wherein the first image has a first resolution;

generating second and third images based on the first image, wherein the second image represents the first image at a second resolution which is less than the first resolution, the third image represents the first image at a third resolution which is less than the second resolution, and the second and third resolutions are predetermined;

transforming the first, second and third images into respective first, second and third data streams; and ordering the first, second and third data streams for transmission in sequence as the third data stream, then the second data stream, and then the first data stream in response to the first, second and third resolutions.

23. The method according to claim 22, wherein:

the second image is generated at the second resolution by dividing the first resolution by a second integer; and the third image is generated at the third resolution by dividing the first resolution by a third integer which is greater than the second integer.

24. The method according to claim 22, wherein the first, second and third images have the same bit depth.

25. The method according to claim 22, wherein the second and third resolutions and the ordering are independent of image content.

26. The method according to claim 22, wherein the second and third resolutions and the ordering are independent of image transmission.

27. The method according to claim 22, further comprising recording the first and second values in a bit plane.

28. The method according to claim 22, further comprising transmitting the third data stream, then the second data stream, and then the first data stream from a streaming server.

29. The method according to claim 22, further comprising:

transmitting the third data stream, then the second data stream, and then the first data stream; and progressively displaying the third image as the third data stream is received and decompressed, then the second image as the second data stream is received and decompressed, and then the first image as the first data stream is received and decompressed.

30. The method according to claim 22, further comprising:

transmitting the third data stream, then the second data stream, and then interrupting the transmission to prevent transmitting the first data stream; and progressively displaying the third image as the third data stream is received and decompressed, then the second image as the second data stream is received and decompressed, and not the first image.

31. The method according to claim 1, wherein the compressed image is transformed into each resolution level by dividing the original resolution by a different predetermined value.

32. The method according to claim 1, wherein the plurality of images each represent the compressed image.

33. The method according to claim 1, wherein the predetermined resolution level is independent of the compressed image.

34. The method according to claim 1, wherein the predetermined resolution level is independent of the transmission.

* * * * *